US005141797A

United States Patent [19]

Wheeler

[11] Patent Number: 5,141,797

[45] Date of Patent: Aug. 25, 1992

[54] INK JET PAPER HAVING CROSSLINKED BINDER

[75] Inventor: James W. Wheeler, Fairport, N.Y.

[73] Assignee: E. I. Du Pont de Nemours and Company, Wilmington, Del.

[21] Appl. No.: 711,246

[22] Filed: Jun. 6, 1991

[51] Int. Cl.$^5$ .............................................. B32B 9/00

[52] U.S. Cl. .................................. 428/195; 428/211; 346/135.1

[58] Field of Search .............................. 428/195, 211; 346/135.1

[56] References Cited

U.S. PATENT DOCUMENTS

| | | | |
|---|---|---|---|
| 4,113,757 | 9/1978 | Kay | 260/429.5 |
| 4,146,669 | 3/1979 | Dikler et al. | 428/328 |
| 4,592,951 | 6/1986 | Viola | 428/323 |
| 4,877,686 | 10/1989 | Riou et al. | 428/514 |
| 4,894,279 | 1/1990 | Sachdev et al. | 346/135.1 |

*Primary Examiner*—Patrick J. Ryan
*Assistant Examiner*—T. A. Powers

[57] ABSTRACT

An ink jet recording sheet comprising a sheet support, e.g., paper, bearing a surface coating comprising (a) a water soluble organic polymeric binder, (b) a titanium chelate crosslinking agent as defined, and (c) an inorganic filler, the weight ratio of (c) to (a) preferably being about 7 to 1 to about 1 to 2. The ink jet recording sheet is useful for ink jet printing.

13 Claims, No Drawings

INK JET PAPER HAVING CROSSLINKED BINDER

TECHNICAL FIELD

This invention relates to an ink jet recording sheet. More particularly, this invention relates to an ink jet recording sheet having a support coated with a coating comprising a water-soluble binder, an inorganic filler and a titanium chelate crosslinking agent.

BACKGROUND OF THE INVENTION

Ink jet printing is important to the business community. Not only does improved success in this endeavor require the continuous updating and improvement of the equipment such as ink jet printers, but improvement of ink jet recording sheets for use with such equipment is important. Ink jet recording sheets generally contain a coating of a polymeric organic binder and a pigment. High resolution and high chroma are desirable properties for ink jet recording sheets. The sheets, in order to achieve these properties, have a thin receptor layer and a low binder to pigment ratio. Relatively thick coating layers tend to hide the dye color and decrease chroma. A problem with having low binder to pigment ratios is that many standard polymeric binders do not have adequate binding strength. Low binding strength results in the pigment in the coating layer dusting off the support. To date, polyvinyl alcohol crosslinked with borate has provided a good coating for ink jet recording sheets. However, the quick reaction of the borate with polyvinyl alcohol requires the coating of the borate and polyvinyl alcohol in separate layers. This in turn increases the expense of the recording sheet. Common polyvinyl alcohol crosslinking agents, e.g., amine formaldehyde condensates, require higher temperatures and longer times to develop strength than is available in standard coating machines used for coating paper.

It is desired that an improved ink jet recording sheet be prepared that provides high resolution as well as high chroma in a sheet having a thin receptor layer and a relatively low binder to filler or pigment ratio, the binder being of such strength that the pigment remains in the receptor layer without dusting off.

SUMMARY OF THE INVENTION

In accordance with this invention, there is provided an opaque ink jet recording sheet comprising a support and a surface coating on the support, the surface coating comprising (a) a water soluble polymeric binder, (b) a titanium chelate crosslinking agent having the general formula selected from the group consisting of:

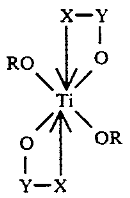

(1)

wherein

X is a functional group containing oxygen or nitrogen;

Y is alkylene of 1 to 6 carbon atoms or arylalkyl;

R is H, alkyl of 1 to 6 carbon atoms or hydroxy substituted alkyl of 1 to 6 carbon atoms; and

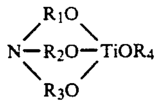

(2)

wherein $R_1$, $R_2$ or $R_3$ can be the same or different, and are alkylene of 1 to 4 carbon atoms, and $R_4$ is alkyl of 1 to 6 carbon atoms; and (c) an inorganic filler.

DETAILED DESCRIPTION OF THE INVENTION

The ink jet recording sheet of the invention includes in its coating (a) a water soluble polymeric binder, (b) a titanium chelate crosslinking agent for crosslinking the polymeric binder, and (c) an inorganic filler, preferably with a high absorption capacity.

Binders

Water soluble polymeric binders useful in the invention are those having hydroxyl or carboxyl groups which can react with the titanium chelate crosslinking agent. Some useful binders include polyvinyl alcohol, polyvinyl alcohol copolymers such as poly(vinyl alcohol-co-vinyl acetate), hydroxypropyl cellulose, acrylic resins such as poly(methyl methacrylate/ethyl acrylate/acrylic acid), sodium alginate, water soluble phenol formaldehyde resins, carboxylated styrene butadiene polymers, carboxymethyl cellulose, hydroxyurethanes, soluble collagen, gelatin, hydrolyzed ethylene vinyl acetate polymers, and polysaccharides such as xanthan gum, gum tragacanth, locust bean gum, carrageenan, guar gum, and agur, etc. Preferred are polyvinyl alcohol or a polyvinyl alcohol copolymer, such as poly(vinyl alcohol-co-vinyl acetate) commonly known as partially hydrolyzed poly(vinyl alcohol). A preferred binder is poly(methyl methacrylate/ethyl acrylate/acrylic acid), wt. ave. mol. wt. 40,000, Acid No. 80, Tg. 53° C. Weight average molecular weights can be determined by gel permeation chromatography (GPC).

Crosslinking Agent

Compound (b) is a titanium chelate crosslinking agent having the general formula:

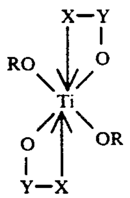

(1)

wherein

X is a functional group containing oxygen or nitrogen, e.g., ketone, ester, acid salt, etc.;

Y is alkylene of 1 to 6 carbon atoms or arylalkyl wherein aryl is 6 to 10 carbon atoms and alkyl is 1 to 6 carbon atoms;

R is hydrogen, alkyl of 1 to 6 carbon atoms, or hydroxy substituted alkyl of 1 to 6 carbon atoms; and

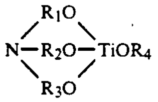

(2)

wherein $R_1$, $R_2$ or $R_3$ can be the same or different, and are alkylene of 1 to 4 carbon atoms, and $R_4$ is alkyl of 1 to 6 carbon atoms.

Suitable titanium crosslinking agents are prepared as described in Smeltz, U.S. Pat. No. 4,609,479, the pertinent disclosure of which is incorporated herein by reference.

Fillers

The filler, component (c), is generally an inorganic pigment such as, for example, silica, various silicates, zeolites, calcined kaolins, diatomaceous earths, barium sulfate, aluminum hydroxides, calcium carbonate, etc.

Additives

In addition to the primary ingredients (a), (b) and (c) the coating solution can contain other additives, e.g., surfactant, humectant, UV absorber, pigment dispersant, difoamer, mold inhibitor, antioxidant, latex, dye mordant and optical brightener as are known to those having ordinary skill in the art.

Amounts

The relative proportions of filler component (c) to polymeric binder (a) is about 7 to 1 to about 0.5 to 1. The ratio of filler to binder is very dependant on the type of filler used A preferred range is 5 to 1 to 3 to 1. Above about 7 to 1 there is dusting since the polymeric binder does not adequately hold the filler. At the ratio of 1 to 2, the coating surface becomes too glossy and loses its paper look.

Supports

Useful supports include cellulose and non-cellulose type supports, although the cellulose type supports, such as paper, are preferred. The degree of sizing for the support can be from 1 second to 1000 seconds as measured by the Hercules size test (HST), as described in TAPPI standards T530 pm-83. The support is chosen so its HST value is compatible with the volume and composition of the ink drop in the printer to be used. For the Iris printer, the preferred HST is in the range of 200 to 500 seconds, most preferably about 350 to 400 seconds.

Preparation

The surface coating is applied to the sheet support surface in a dry coating weight range of about 10 g/$M^2$ to about 2 g/$M^2$. At a dry coating weight of less than about 2 g/$M^2$ the ink spread is too great upon printing, e.g., using a Herts Iris 3024 ink jet printer manufactured by Iris Graphics, Inc., Bedford, Mass. At a coating weight of more than 10 g/$M^2$, low chroma is attained because the dye is hidden by the quantity of filler. Chroma is lost by increased light scattering.

The surface coating is applied to the sheet support by coating means known to those skilled in the art. Suitable coating methods include: conventional roller coating or knife coating methods, e.g., air knife, trailing blade, etc. All the ingredients can be premixed to form the coating that is applied to the surface of the sheet support at the dry coating weights set out above. It is entirely unexpected that the crosslinking agent can be present with the polymeric binder for an extended period of time prior to coating, e.g., 24 hours. Boron-type crosslinking agents, for example, borate, well known as useful for crosslinking polyvinyl alcohol, etc., must be put on in a separate layer because they crosslink a binder such as polyvinyl alcohol instantly. The titanium chelates used in the present invention, as noted, can be present with the polymeric binders over extended periods of time. It is desirable, however, to not hold the coating solution at a temperature above about 50° C. for too long a time.

INDUSTRIAL APPLICABILITY

The coating solution of the invention can be coated onto the sheet support from a single solution. The coating solution has a relatively low binder to filler ratio and upon drying on the sheet support exhibits little, if any, dusting off of the filler. The ink jet recording sheet has high resolution and high chroma. It provides an excellent ink jet printing surface.

EXAMPLES

The following examples, wherein the percentages and parts are by weight, illustrate but do not limit the invention. The printer described in the examples is a Herts, continuous drop ink jet printer. Ink is pumped through a vibrating capillary tube at high pressure. The ink stream breaks up into uniform droplets. Nonimage drops are charged and are electrically deflected into a gutter. Image droplets land on a paper which is carried past the droplet stream, usually by mounting the paper on a revolving drum.

EXAMPLE 1

19.7 Kg of polyvinyl alcohol (pVOH), having a viscosity of 28 to 32 as a 4% solution and a mole percent degree of hydrolysis of 99.0 to 99.8, were added to the vortex of 585 Kg of rapidly stirred deionized water. This mixture was stirred for 10 minutes at room temperature. The pVOH was dissolved by heating the mixture to 95° C. for 30 minutes. 99 Kg of 4 μm silica, Syloid® 72, Davison Chemical Division, W. R. Grace & Co., Baltimore, Md., was added and the mixture was stirred with high shear for 15 minutes. After the mixture cooled to room temperature, 25 Kg of Tyzor® 101 Organic Titanate, E. I. du Pont de Nemours and Company, Wilmington, Del., was added. This gave 712 Kg of slurry which had a viscosity of 100 cps and measured 17 percent solids. This slurry was coated on an 80 g/$M^2$, 350 HST paper stock, Schoeller Technical Papers, Inc., Pulaski, N.Y., at 300 ft/min (60.96 M/min) at the rate of 4 g/$M^2$. The coating was dried to final moisture of six percent and had good adhesion to the paper stock and showed no dusting when rubbed by hand.

EXAMPLE 2

A 16.5% slurry of Syloid® 72 silica described in Example 1 was prepared by mixing with high shear 33 g of the silica and 167 g of deionized water in a Waring blender for 15 minutes. To 150 g of 4% pVOH solution was added 7.5 g of Tyzor® 101 described in Example 1. These two were mixed in the proportions shown in Table 1 below to give the pigment to binder ratios shown. The resulting slurries were coated on an 80 g/$M^2$ 350 HST paper stock described in Example 1 at a coating weight of approximately 5 g/$M^2$ and were dried at 50° C. for 10 minutes. As can be seen in Table 1, if the pigment to binder ratio was greater than 7 to 1, the coating showed dusting.

TABLE 1

| 16.5% Silica | 4% pVOH | Pigment/Binder Ratio | Dusting |
|---|---|---|---|
| 18.2 | 15 | 5/1 | no |
| 18.2 | 13.6 | 5.5/1 | no |
| 18.2 | 12.5 | 6/1 | no |
| 18.2 | 11.5 | 6.5/1 | no |
| 18.2 | 10.7 | 7/1 | no |
| 18.2 | 10.0 | 7.5/1 | slight |
| 18.2 | 9.4 | 8/1 | yes |
| 18.2 | 8.3 | 9/1 | yes |
| 18.2 | 7.5 | 10/1 | yes |

EXAMPLE 3

A 16.5% silica slurry and a 4% pVOH solution were prepared as described in Example 2. These were combined as shown in Table 2 below to give decreasing pigment to binder (P/B) ratios. The combined components were coated and dried as described in Example 2. The samples were evaluated for appearance and were printed on an Iris 3024 ink jet printer with a six color test target. As shown in Table 2, as the P/B drops below 1 to 2, the surface looks glossy and no longer has the appearance of normal paper. Table 2 also shows that the average chroma dropped as the P/B decreased.

TABLE 2

| P/B | 16.5% Silica | 4% pVOH | Glossy | Average Chroma* |
|---|---|---|---|---|
| 1/1 | 6 | 25 | no | 65.23 |
| ½ | 3 | 25 | no | 61.35 |
| ⅓ | 3 | 25 | slightly | 60.33 |
| 1/6 | 1 | 25 | yes | 60.18 |
| 1/12 | 0.5 | 25 | yes | 60.01 |

*Average Chroma is sum of Chroma for yellow, magenta, cyan, red, green and blue divided by 6.

EXAMPLE 4

A coating slurry was prepared by mixing 180 g of a 16.7% silica slurry, 150 g of a 4% pVOH solution, and 7.5 g of Tyzor® 101 described in Example 1. This slurry was coated onto an 80 g/M$^2$ 350 HST paper stock as described in Example 1 at the coating weights shown in Table 3. The coatings were dried at 50° C. for 5 minutes. A six color test pattern was printed onto the paper using an Iris 3024 ink jet printer described in Example 3. As seen in Table 3, the optimum coating weight is in the range of 1 to 6 g/M$^2$.

TABLE 3

| gms/M$^2$ | Average Chroma* |
|---|---|
| 16.5 | 63.0 |
| 11.5 | 64.0 |
| 8.6 | 65.2 |
| 6.0 | 68.8 |
| 3.0 | 72.0 |
| 1.25 | 69.5 |
| 0.53 | 64.1 |
| 0.47 | 63.7 |

*See Table 2

EXAMPLE 5

180 g of a 16.7% silica slurry and 150 g of 4% pVOH were mixed. To 33 g portions of this mixture was added the amounts of Tyzor® 101 described in Example 1 as shown in Table 4. The portion was then coated at approximately 3 g/M$^2$ and dried 5 minutes at 50° C. As can be seen in Table 4 below, at least 1.25 g of titanium chelate is needed for each 1.0 g of pVOH. At lower levels, the amount of pVOH crosslinking is not sufficient to strengthen the coating against abrasion.

TABLE 4

| Titanium Chelate g/g PVOH | Dusting |
|---|---|
| 0 | yes |
| 0.42 | yes |
| 0.83 | slight |
| 1.25 | no |
| 1.67 | no |
| 2.50 | no |
| 4.17 | no |

EXAMPLE 6

180 g of a 16.7% silica dispersion, 150 g of 4% pVOH and 7.5 g of Tyzor® 101 were mixed together and the viscosity was measured to be 13 cps. After this slurry was stirred at room temperature for 18 hours, the viscosity was measured again and found to be 12 cps. The viscosity did not change, within the experimental measurement error. Coatings were made on a paper with the fresh and the aged slurry. Both showed no dusting. The paper used had an underlayer coating of 4 g/M$^2$ clay.

EXAMPLE 7

40 g of a 16.7% slurry of a 4 μm silica was prepared in a 0.25% solution of the surfactant Du Pont Product BCO, E. I. du Pont de Nemours and Company, Wilmington, Del. To the slurry was added 200 g of a 5% hydroxypropyl cellulose (Aqualon Klucel® Type L), and 3 g of Tyzor® TE Organic Titanate, E. I. du Pont de Nemours and Company, Wilmington, Del. This was coated at 3 g/M$^2$ on an 80 g/M$^2$ 350 HST paper stock described in Example 1 and dried 10 minutes at 50° C. The coating showed no dusting. The control coating without the organic titanate showed dusting. The sample was printed on the Iris 3024 ink jet printer described in Example 3. The chroma values were: yellow 90.4, magenta 65.4, cyan 52.2, red 2.4, green 63.5, and blue 54.4.

EXAMPLE 8

A 6% solution of poly(methyl methacrylate/ethyl acrylate/acrylic acid), wt. ave. mol. wt. 200,000, Acid No. 80, Tg. 37° C., was prepared by stirring 12 g of the resin, 12 g of 12N ammonium hydroxide, and 176 g of deionized water. To 10 g of the so prepared 6% solution was added 6 g of a 16.7% silica dispersion and 1.2 g of Tyzor® TE Organic Titanate described in Example 7. This was coated at 3 g/M$^2$ on an 80 g/M$^2$ 350 HST paper stock described in Example 1 and dried 10 minutes at 50° C. The coating showed no dusting. The control coating without the organic titanate showed dusting. The sample was printed on the Iris 3024 ink jet printer described in Example 3. The chroma values were yellow 94.5, magenta 67.9, cyan 54.0, red 69.5, green 64.2, and blue 57.8.

EXAMPLE 9

20 g of a 2.5% solution of Kelgin® XL (sodium alginate), Kelco Division of Merck & Co., Inc., San Diego, Calif., were added to 3 g of a 16.7% silica dispersion. 1 g of Tyzor ® TE Organic Titanate described in Example 7 was added. This slurry was coated at 5 $g/M^2$ on an 80 $g/M^2$ 350 HST paper stock described in Example 1 and dried 10 minutes at 50° C. The coating showed no dusting. The control coating without the organic titanate showed dusting. The sample was printed on the Iris 3024 ink jet printer described in Example 3. The chroma values were yellow 91.5, magenta 64.8, cyan 50.4, red 67.6, green 61.3, and blue 48.0.

EXAMPLE 10

The composition of each coating slurry is shown in Table 5 below. These were coated at 6 $g/M^2$ on a 120 $g/M^2$, gelatin subbed paper stock which is normally used for silver halide photographic emulsions. The samples were dried at 50° C. for 5 minutes. All samples were printed on the Iris 3024 ink jet printer described in Example 3 and evaluated for average chroma. As can be seen, the other fillers give nearly equivalent chroma.

TABLE 5

| Coating | A | B | C | D |
|---|---|---|---|---|
| 4% pVOH, Polyvinyl Alcohol | 15 | 15 | 15 | 15 |
| Tyzor ® 101 Organic Titanate | 0.6 | 0.6 | 0.6 | 0.6 |
| 16.7% Syloid ® 72 Silica | 18 | 12.6 | 12.6 | 12.6 |
| 16.7% Huberfill ® 96 Sodium. Magnesium Aluminosilicate. J. M. Huber Corp., Havre de Grace. MD | 0 | 5.0 | 0 | 0 |
| 16.7% Paperadd ® PGAB 741 Hydrated Alumia. Reynolds Metals Co., Richmond, VA | 0 | 0 | 5.4 | 0 |
| 16.7% Atomite ® (calcium carbonate) C. C. America, Inc., Sylacauga, AL | 0 | 0 | 0 | 5.4 |
| Average chroma | 64.4 | 62.2 | 62.6 | 62.7 |

EXAMPLE 11

Control

Two slurries were prepared wherein both were composed of 18 g of 16.7% silica slurry and 15 g of 4% pVOH. To one was added 1 g of a 5% sodium borate solution and to the other was added 1 g of a 5% boric acid solution. Both slurries quickly contain large clumps of gelled material and were not coatable.

What is claimed is:

1. An opaque ink jet recording sheet comprising a support and a surface coating on the support, the surface coating comprising (a) a water soluble polymeric binder, (b) a titanium chelate crosslinking agent having the general formula selected from the group consisting of:

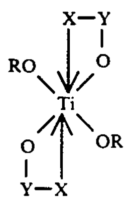

(1)

wherein

X is a functional group containing oxygen or nitrogen;

Y is alkylene of 1 to 6 carbon atoms or arylalkyl

R is H, alkyl of 1 to 6 carbon atoms, or hydroxy substituted alkyl of 1 to 6 carbon atoms; and

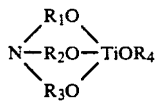

(2)

wherein $R_1$, $R_2$, or $R_3$ can be the same or different, and are alkylene of 1 to 4 carbon atoms, and R4 is alkyl of 1 to 6 carbon atoms; and (c) an inorganic filler, the binder being crosslinked to the crosslinking agent, the surface coating being applied in a weight range of from about 1 $g/M^2$ to about 10 $g/M^2$ and the weight ratio of (c) to (a) being about 7:1 to about 1:2.

2. An ink jet recording element according to claim 1 wherein the titanium chelate crosslinking agent is of the formula:

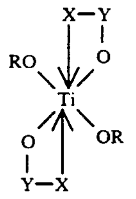

(1)

wherein

X is a functional group containing oxygen or nitrogen;

Y is alkylene of 1 to 6 carbon atoms or arylalkyl;

R is H, alkyl of 1 to 6 carbon atoms.

3. An ink jet recording element according to claim 1 wherein the titanium chelate crosslinking agent is of the formula:

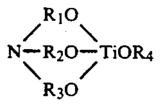

(2)

wherein $R_1$, $R_2$ or $R_3$ can be the same or different, and are alkylene of 1 to 4 carbon atoms, and $R_4$ is alkyl of 1 to 6 carbon atoms.

4. An ink jet recording element according to claim 1 wherein the surface coating is present on the support in a range of about 2 $g/M^2$ to about 10 $g/M^2$.

5. An ink jet recording element according to claim 1 wherein the weight ratio of (c) to (a) is in the range of about 5:1 to about 3:1.

6. An ink jet recording element according to claim 1 wherein the inorganic filler is silica.

7. An ink jet recording element according to claim 1 wherein the water soluble polymeric binder is selected from binders having hydroxyl or carboxyl groups.

8. An ink jet recording element according to claim 7 wherein the water soluble polymeric binder is selected from the group consisting of polyvinyl alcohol, polyvinyl alcohol copolymers, hydroxypropyl cellulose, acrylic resins, sodium alginate, water soluble phenol formaldehyde resins, carboxylated styrene butadiene polymers, carboxymethyl cellulose, hydroxyurethanes, soluble collagen, gelatin, hydrolyzed ethylene vinyl acetate polymers, and polysaccharides.

9. An ink jet recording element according to claim 8 wherein the water soluble polymeric binder is polyvinyl alcohol.

10. An ink jet recording element according to claim 8 wherein the water soluble polymeric binder is substantially all poly(vinyl alcohol-co-vinyl acetate).

11. An ink jet recording element according to claim 8 wherein the water soluble polymeric binder is poly(-methyl methacrylate/ethyl acrylate/acrylic acid), wt. ave. mol. wt. 200,000, Acid No. 80, Tg. 37° C.

12. An ink jet recording element according to claim 8 wherein the water soluble polymeric binder is poly(-methyl methacrylate/ethyl acrylate/acrylic acid), wt. ave. mol. wt. 40,000, Acid No. 80, Tg. 53° C.

13. An ink jet recording element according to claim 1 wherein the support is paper.

* * * * *